US009268753B2

(12) United States Patent
Hendry et al.

(10) Patent No.: US 9,268,753 B2
(45) Date of Patent: Feb. 23, 2016

(54) AUTOMATED ADDITION OF ACCESSIBLITY FEATURES TO DOCUMENTS

(75) Inventors: Robert Olson Hendry, San Francisco, CA (US); Heidi Jungel, Fremont, CA (US)

(73) Assignee: APOLLO EDUCATION GROUP, INC., Phoenix, AZ (US)

( * ) Notice: Subject to any disclaimer, the term of this patent is extended or adjusted under 35 U.S.C. 154(b) by 902 days.

(21) Appl. No.: 13/280,296

(22) Filed: Oct. 24, 2011

(65) Prior Publication Data

US 2013/0104029 A1 Apr. 25, 2013

(51) Int. Cl.
| | |
|---|---|
| *G06F 17/00* | (2006.01) |
| *G06F 17/22* | (2006.01) |
| *G06F 17/24* | (2006.01) |
| *G06F 17/21* | (2006.01) |

(52) U.S. Cl.
CPC ............ *G06F 17/227* (2013.01); *G06F 17/218* (2013.01); *G06F 17/2247* (2013.01); *G06F 17/24* (2013.01); *G06F 17/245* (2013.01)

(58) Field of Classification Search
CPC ..... G06F 17/218; G06F 17/24; G06F 17/245; G06F 17/227; G06F 17/2247
USPC .......... 715/234, 229, 237, 239, 249, 255–256
See application file for complete search history.

(56) References Cited

U.S. PATENT DOCUMENTS

| | | | |
|---|---|---|---|
| 7,792,701 B2 | 9/2010 | Basson et al. | |
| 8,090,800 B2 | 1/2012 | Yee | |
| 8,566,807 B1 * | 10/2013 | Colton et al. | ................ 717/137 |
| 8,719,451 B1 * | 5/2014 | Colton et al. | ................ 709/248 |
| 2002/0178007 A1 * | 11/2002 | Slotznick | ............... G09B 5/06 704/270.1 |
| 2003/0061299 A1 * | 3/2003 | Brown | ............... H04L 67/2823 709/214 |
| 2003/0061309 A1 * | 3/2003 | Brown et al. | ................ 709/218 |
| 2005/0183109 A1 | 8/2005 | Basson et al. | |
| 2006/0090138 A1 * | 4/2006 | Wang et al. | ................ 715/760 |
| 2009/0113287 A1 | 4/2009 | Yee | |
| 2010/0205523 A1 * | 8/2010 | Lehota et al. | ................ 715/235 |
| 2011/0249284 A1 * | 10/2011 | Seabright et al. | ........... 358/1.13 |

OTHER PUBLICATIONS

A. King, G. Evans and P. Blenkhorn, "WebbIE: a Web Browser for Visually Impaired People", Aug. 21, 2004, Department of Engineering, University of Cambridge, pp. 12.*
W3C, Accessible Rich Internet Applications (WAI-ARIA) 1.0, W3C Working Draft Sep. 16, 2010, pp. 5.*
U.S. Appl. No. 10/146,099, filed May 14, 2002, Yee.
U.S. Appl. No. 10/779,376, filed Feb. 13, 2014, Basson, et al.
U.S. Appl. No. 12/368,133, filed Feb. 9, 2009, Lehota, et al.

* cited by examiner

*Primary Examiner* — Chau Nguyen
(74) *Attorney, Agent, or Firm* — Hickman Palermo Becker Bingham LLP (57) ABSTRACT

A method includes analyzing a first document to identify a first set of one or more tags and responsive to identifying the first set of one or more tags: automatically producing a second document based in part on first set of one or more tags, where the second document includes one or more accessibility features that were not in the first document.

45 Claims, 5 Drawing Sheets

FIG. 1

```
<table>
<tr class="bold-text"> <td id="cellName">cell one, row one</td><td>cell two, row one</td></tr>
<tr><td>cell one, row two</td><td>cell two, row two</td></tr> <tr><td> </td><td>blah blah blah</td></tr>
<tr><td> </td><td class="bold-text red-text" style="width:5%;" id="rowName">BOLD RED TEXT</td></tr>
</table>
```

Original HTML Code
202

FIG. 2A

```
Table with two columns and four rows
Cell one, row one, cell two, row one
Cell two, row two, blah blah blah
Bold Red text
table end
```

Screen Reader Readout A
204

FIG. 2B

```
<div class="twoCol-table">
<span class="bold-text"><div id="cellName" class="right-column ">cell one, row one</div><div id="id_8" class="right-column "><cell two, row one</div></span>
<span class=""><div id="id_10" class="right-column ">cell one, row two</div><div id="id_11" class="right-column "><cell two, row two</div></span>
<span class=""><div id="id_13" class="right-column "> </div><div id="id_14" class="right-column ">blah blah blah</div></span>
<span class=""><div id="id_16" class="right-column "> </div><div style="width: 5%;" id="rowName" class="right-column bold-text red-text">BOLD RED TEXT</div></span>
</div>
```

Accessibility-Enhanced HTML Code
302

FIG. 3A

Cell one, row one
Cell two, row one
Cell two, row two, blah blah blah bold red text Screen Reader Readout B
304

AUTOMATED ADDITION OF ACCESSIBLITY FEATURES TO DOCUMENTS

FIELD OF THE INVENTION

The present invention relates to document accessibility in general. More specifically, the invention relates to automatically modifying a document to improve document accessibility.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

People with disabilities use electronic documents (for example, pdfs, web pages, word processing documents, or spreadsheet documents) with the help of assistive technologies that identify the content of the electronic documents. Assistive technologies, as referred to herein, include any software and/or hardware that interprets information for presenting to a user. Examples of assistive technologies include, but are not limited to screen readers, text to speech software, digital book players, Braille displays, Braille embossers, and electronic note takers. Assistive technologies convey information using visual, audio, or touch stimuli. For example, assistive technology such as a screen reader may be configured to read out the contents of a web page that are normally displayed to a user when the web page is rendered by a web browsing application.

However, assistive technologies may not properly be able to identify the content within a document if the document is not designed for interpretation by assistive technologies. For example, a Hyper Text Markup Language (HTML) document includes elements such as a table that is formatted with tags <tr>, <td>, or <th>. Some screen readers are unable to distinguish these HTML tags that format the table from table values that are displayed when the HTML document is rendered by a web browsing application. As a result, screen readers read the tags out loud, as if the tags were part of the normal displayed textual content of the document, for a user with a visual disability. Screen readers are unable to determine a proper sequence in which the table values should be read to sensibly convey the content to a user, or unnecessarily read out layout information such as "table with two columns and one row" to a user.

One or more embodiments are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding. It will be apparent, however, that one or more embodiments may be practiced without these specific details. In other instances, well-known structures and devices are shown in block diagram form in order to avoid unnecessarily obscuring one or more embodiments.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

Methods for automatically modifying documents to improve document accessibility are provided, in accordance with one or more embodiments. Modifying a document to improve document accessibility refers to modifications which result in proper or better interpretation by an assistive technology, or which result in improving a user's ability to understand the content of a document.

Documents that are not designed for accessibility by assistive technologies are good candidates for automatic modification. For example, documents that do not conform to the guidelines from the Web Accessibility Initiative-Accessible Rich Internet Applications (WAI-ARIA) may not be designed for accessibility. Documents that include some accessible features and lack other accessible features are good candidates for automatic modification to improve document accessibility.

In one embodiment, methods for automatically producing a document include find and replace methods which replace text within a document with alternate text that improves document accessibility. Methods for automatically producing a document include capturing data that is displayed to a user from a first document and writing a new document which displays substantially the same data but improves the document accessibility. Methods for automatically producing a document perform the production at the server side, the client side, or a combination of both.

Although specific components are recited herein as performing the method steps, in other embodiments, agents or mechanisms acting on behalf of the specified components perform the method steps. Further, although one or more embodiments are discussed with respect to components distributed over multiple systems (for example, a browser on a client machine and a document modifier on server), other embodiments include systems where all components are on a single system (for example, modify documents stored on a personal computer for display on the personal computer). Furthermore, embodiments are applicable for dynamically modifying any set of documents (for example, obtained over a network, a local machine, a server, a peer machine, within a software application, etc.).

While specific embodiments are described in which documents are automatically modified, the techniques described herein are not limited to the disclosed embodiments, and the techniques described herein may be applicable to other embodiments.

Accessibility Features

As shall be explained in detail hereafter, techniques are provided in which "accessibility features" are automatically added to documents to improve the accessibility of the documents. As used herein, an accessibility feature is any feature that improves a user's ability to understand the content of a document. For example, accessibility features improve a user's ability to understand the content of a document by:

adding to the document information that can be accessed by the assistive technology for presentation to a user, removing from the document extra information that should not be accessed by an assistive technology for presentation to a user, and/or modifying information in the document to increase the likelihood that the document will be interpreted and presented correctly (for example, in a correct sequence, with correct associations, with correct emphasis, etc.) by an assistive technology.

Figure 1:
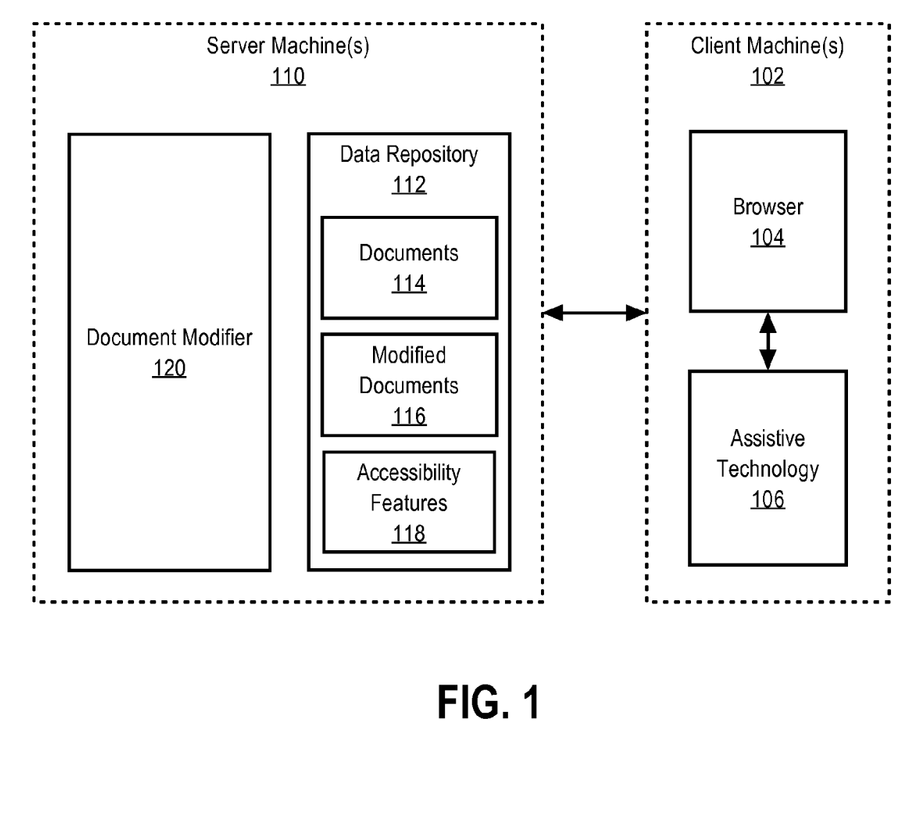
FIG. 1 is a block diagram illustrating an example system for automatically producing documents to improve document accessibility in accordance with one or more embodiments.

Referring to FIG. 1, accessibility features (118) may be particular tags which, when added to a document, allow for proper interpretation of the document by assistive technologies. For example, accessibility features (118) correspond to formatting, styles, or other markup that can be applied to one or more elements within a document. Accessibility features (118) correct one or more problems associated with inaccessible features described below. While FIG. 1 illustrates a system (100) in which accessibility features (118) are stored separately, in a data repository (112), from modified documents (116), in alternative embodiments the accessibility features (118) are not separately stored in the data repository (112).

In an embodiment, accessibility features (118) correspond to metadata, describing content in a modified document (116), that can be read by software and communicated to a person with disabilities (for example, via a Braille terminal or an audio readout). In an example, the metadata includes the content that is displayed when a web page is rendered without including any formatting tags that are not displayed when the web page is rendered.

In an embodiment, accessibility features (118) corresponds to a formatting of content within a document (114) or a modified document (116) which is designed for a particular assistive technology or recognizable by an assistive technology. In an example, an accessibility feature (118) corresponds to a formatting of a table using HTML formatting tags such as <div> or <span> which can be used to dictate the manner in which a particular screen reader reads out table values. The screen reader skips read out of <div> and <span> tags because the tags are recognized as formatting tags. Furthermore, a screen reader may interpret the content for read out based on <div> and <span> tags that conveys an accurate understanding of the table to a user instead of reading out table cells in a possibly improper sequence.

Other examples of accessibility features (118) include, but are not limited to, text alternatives for non-text content, using a minimum font size, using colors which distinguish the foreground from the background, and making all functionality of a document available from a keyboard.

In an embodiment, accessibility features (118) corresponds to code (for example, JavaScript) which when executed adds other accessibility features (118) to the document (114) to produce the modified document (116). For example, accessibility features (118) correspond to code which extracts content from a document with formatting tags that are not properly interpreted by assistive technologies. The accessibility features (118) correspond to code which uses the extracted content to produce a modified document (116) with different formatting tags than the original formatting tags. The modified document (116) produced by the assistive technologies may use different formatting tags that are recognizable to assistive technologies and that present the content in the same manner as the original formatting tags.

In an embodiment, the accessibility feature (118) is code that reformats the content of a document to be displayed differently. For example, the code changes the color or size of a font to make text easier to read by a visually impaired reader. The code used to convert the document (114) to modified document (116) is within the document (114) itself or separate from the document (114).

Inaccessible Features

An "inaccessible feature", as used herein, refers to content or formatting which cannot be properly interpreted by one or more assistive technologies for presentation to a user. For example, an assistive technology such as a screen reader is designed for reading out the content from a HTML document that is displayed when the HTML document is rendered by a browser application and designed for not reading out HTML formatting tags that are used for formatting of the displayed content. However, a particular HTML document includes some HTML formatting tags that are not recognized, by the screen reader, as formatting tags that are not to be read out. As a result of not recognizing the formatting tags, the formatting tags are read out by the screen reader as a portion of the displayed content. In this example, the HTML formatting tags are referred to as inaccessible features since the screen reader does not recognize the HTML formatting tags and reads out the HTML formatting tags as displayed content.

In an embodiment, an inaccessible feature corresponds to one or more elements that lack a label or a description that can be accessed by an assistive technology. For example, a displayed line on a web page includes text, followed by a text field for user input, followed by additional text. A screen reader reads out the text, the additional text, and lastly the text field based on the sequence in which the elements appear in the document or using some other ordering method. The information conveyed to the user in this example results in an improper understanding of the displayed line by the user. The information may not convey the relationship between different objects on a displayed line, for example, relationship between labels and other objects. In an example, an inaccessible feature corresponds to a link in a web page without a title for readout by a screen reader.

In an embodiment, an element without an "id" or class is referred to as an inaccessible feature because the lack of the id or class prevents code (for example JQuery or JavaScript) to refer to the element or prevents the use of cascading style sheets for formatting purposes (for example, to increase the font size for all text or to provide additional context or metadata).

In an embodiment, an inaccessible feature corresponds to a design component that is interpreted and presented by an assistive technology when that design component should not be presented by the assistive technology. In another embodiment, an inaccessible feature refers to a component that is interpreted and not presented by an assistive technology when that design component should be presented by the assistive technology. Design components that should or should not be presented to a user are determined based on user preferences, definition by a programmer or administrator, based on the context of the page, or based on other criteria. In an example, an image separating two sections on a web page or a table used only for data layout purposes in a HTML document should not be presented to a visually impaired user based on user preferences. The design component is referred to as an inaccessible feature because an assistive technology such as a screen reader is not able to determine based on the information within the document that the design component is not to be presented to a user.

In another example, an inaccessible feature corresponds to one or more components of a table in a HTML document. The components do not provide enough information for a screen reader to read out the table values of a table in a sequence that would properly convey the description of the table to a user. Table values read out of sequence result in a misunderstanding by the user with regard to which table values are in which rows or columns, or with regard to which table values are associated with which other table values.

In another example, an inaccessible feature corresponds to one or more elements within a document (114) that cannot be navigated to by a user of the document (114). For example, a particular checkbox within a HTML document (114) can only be checked by a mouse click. In this example, the particular checkbox is inaccessible to a user limited to the keyboard input. The user may be disabled and/or unable to use the keyboard or the user may be operating a device such as a cell phone with limited functionality. Accordingly, an inaccessible feature is inaccessible due to user disability or due to environmental restrictions such as device software or device hardware limitations. In another example, an inaccessible feature corresponds to navigation between interface elements that do not allow the use of a keyboard or other input tool selected by a user.

System Architecture and Functionality

Although a specific computer architecture is described hereafter, other embodiments are applicable to any architecture that can be used to automatically add one or more accessibility features to documents.

FIG. 1 shows an example system (100) in accordance with one or more embodiments. As shown in FIG. 1, the example system (100) includes a client machine (102) and a server machine (110). Data or components described with reference to a particular machine may be stored on or implemented by another machine. Additional devices and/or components not described herein may be used to perform any of the functionality described herein. A single device or component may be used to perform all of the functionality described herein.

In an embodiment, the client machine (102) corresponds to any system used for presenting a document (114) or a modified document (116) to a user in an audio, visual, or touch (for example, Braille) format. Examples of client machines (102) include, but are not limited to desktop computers, laptops, tablets, mobile phones, personal digital assistants (PDAs), book readers, and/or other digital computing devices. As shown in example system (100), the client machine (102) includes one or more of: a browser (104), an assistive technology (106), or any another application used for presenting information within a document to a user. The client machine (102) may also include one or more of: the data repository (112) and the document modifier (120) that are illustrated, for purposes of explanation, as implemented on the server machine (110).

In an embodiment, the browser (104) corresponds to any application that can render contents from a document for display to a user. A browser (104) is illustrated and used as an example of software that presents content to a user. Any other hardware or software application that presents content from a document to a user in an audio, visual, or touch format may be used instead of or in addition to the browser (104). For example, a pdf reader is used for displaying content from a pdf document or a spreadsheet application is used to present data from a spreadsheet document. Examples described herein with relation to a specific application for presenting content are equally applicable to other applications that present content.

In an example, the browser (104) corresponds to a web browser which includes functionality to request a web page, obtain the web page, and render the web page for display to a user. In another example, the browser (104) modifies a web page received from a server to obtain a modified web page, and renders the modified web page for display to a user.

In an embodiment, an assistive technology (106) illustrated as implemented on the client machine (102), includes assistive, adaptive, and rehabilitative software and/or hardware for people with disabilities. Assistive technologies enable people to perform tasks that the people were formerly unable to accomplish, or had great difficulty accomplishing, by providing enhancements to or changed methods of interacting with the technology needed to accomplish such tasks. Examples of assistive technology (106) include text-to-speech tools that read out the text being displayed on a screen. In another example, an assistive technology (106) converts text or audio in a particular language to text or audio in a different language. An assistive technology magnifies the contents of a document, highlight text, modify font sizes and colors, or performs other functions which make a document easier to access. In another example, an assistive technology provides output to a Braille device.

In one or more embodiments, the assistive technology (106) is implemented as a standalone application or as a component of another application (for example, as a browser plug-in or a toolbar component). In an example, the assistive technology (106) is implemented as a component of an operating system. The system (100) may include an assistive technology (106) without the use of a browser (104). Product examples of assistive technologies include, but are not limited to, Job Access for Windows and Speech (JAWS) by Freedom Scientific, Dragon Naturally Speaking by Nuance Communications, NonVisual Desktop Access (NVDA), ChromeVox by Google Corporation, VoiceOver by Apple Corporation, Supernova by Dolphin Computer Access, Edbrowse by Karl Dahlke, Spoken Web by Ehal Shalom, Fire Vox by Charles L. Chen, 95Reader by SSCT, COBRA by BAUM Retec, Linux Screen Reader by GNOME/Linux, Virtual Vision by MicroPower, and ZoomText by Ai Squared.

In an embodiment, the server machine (110) corresponds to any device that is communicatively coupled with the client machine (102) and sends data to the client machine (102). The server machine (110) sends the data in response to receiving one or more requests from the client machine (102).

In an embodiment, the server machine (110) includes a data repository (112) storing one or more of: documents (114), modified documents (116) and accessibility features (118). The data repository (112) corresponds to any data storage device (for example, local memory on the server machine (110), web servers connected over the internet, machines within a local area network, a memory on a mobile device, local memory on the client machine (102), etc.). In one or more embodiments, access to the data repository (112) is restricted and/or secured. As such, access to the data repository (112) requires authentication using passwords, secret questions, personal identification numbers (PINs), biometrics, and/or any other suitable authentication mechanism. Those skilled in the art will appreciate that elements or various portions of data stored in the data repository (112) may be distributed (for example, stored on client machine (102) or at other servers). In one or more embodiments, the data repository (112) includes flat, hierarchical, network based, relational, dimensional, object modeled, or data files structured otherwise. In an example, data repository (112) is maintained as a table of a SQL database. In addition, data in the data repository (112) is verified against data stored in other repositories.

In an embodiment, documents (114) correspond to any files stored in memory (for example, on the server machine (110) or client machine (102)). Documents (114) include, but are not limited to, pdfs, web pages, word processing documents, spread sheet documents, slides, images, video files, etc. Documents (114) are requested by an application executing on a client system (102). For example, a document (114) corresponding to a web page is requested by browser (104) executing on the client system (102).

In an embodiment, documents (114) include documents that have at least one inaccessible feature. In an embodiment, documents (114) are modified by one or more components of system (100) to include an accessibility feature (118). Documents (114) that are modified by one or more components of system (100) to include an accessibility feature (118) are referred to herein as modified documents (116). Documents (114) with one or more accessibility features (118) are modified to include additional accessibility features (118). Modified documents (118) also include new documents that are created using documents (114).

Document Modifier

In an embodiment, the document modifier (120) corresponds to hardware and/or software that produces modified documents (116) by adding one or more accessibility features (118) to documents (114). In one or more embodiments, the document modifier (120) adds additional accessibility features to a document (114) that already has one or more accessibility features (118).

In an example, the document modifier (120) modifies the document (114) by directly converting the document (114) to an accessibility-enabled document or adding code to the document (114) which when executed converts the document to an accessibility-enabled document. An accessibility-enabled document is a document that has been modified to include information that improves a user's understanding of the document. In an example, the document modifier (120) modifies a web page by adding JQuery and/or JavaScript which when executed converts the web page into an accessibility-enabled web page.

The code executed by the document modifier (120) to add one or more accessibility features (118) is included within the document (114) or stored separately from the document (114).

In an embodiment, modifying a document includes making one or more changes to a document (114) to obtain a modified document (116). The modified document (116) is stored in addition to the original document (114) or instead of the original document (114). Modifying a document includes producing a new document based on the original document (114). For example, modifying a document includes analyzing the contents of the original document (114) and creating a new document based on the analysis of the contents of the original document (114). Modifying a first document (114) to obtain a second document may be referred to herein as producing the second document.

Each of these components described above may be located on the same device or may be located on separate devices coupled by a network (e.g., Internet, Intranet, Extranet, Local Area Network (LAN), Wide Area Network (WAN), etc.), with wire and/or wireless segments. In one or more embodiments, the example system (100) is implemented using a client-server topology. The example system (100) itself is an enterprise application running on one or more servers, a peer-to-peer system, or resident upon a single computing system. In one or more embodiments, the example system (100) is accessible over a network connection (not shown), such as the Internet, by one or more users. Information and/or services provided by the example system (100) may also be stored and accessed over the network connection.

Document Modification Examples

Figure 2A:
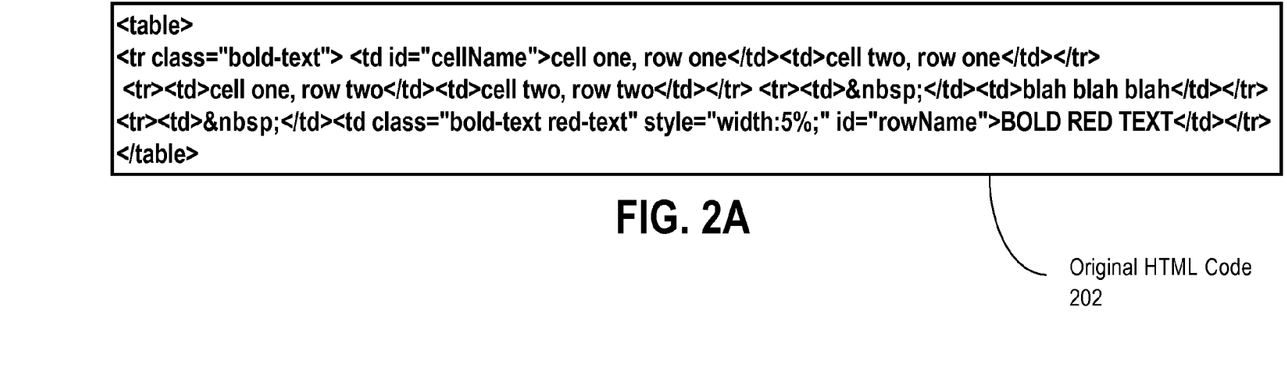
FIGS. 2A, 2B, 3A, and 3B illustrate examples of document portions and interpretation by at least one assistive technology in accordance with one or more embodiments.
Figure 2B:
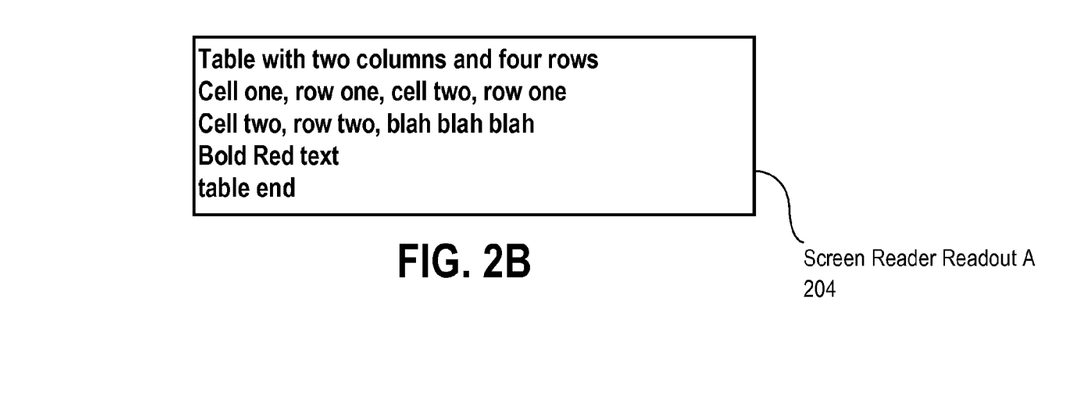

FIG. 2A, FIG. 2B, FIG. 3A, and FIG. 3B illustrate an example in which the <div> and <span> tags are used in an accessibility-enabled document instead of a <table> tag in an inaccessible document. An example of original HTML code (202) is presented in FIG. 2A. As shown in FIG. 2A, the tag <table> is used with tags <tr> and <td> in a layout table to display the content in a particular format.

When a HTML webpage with the original HTML code (202) is rendered by a browser, the data is shown in a table format. In an example, a particular screen reader application used by a blind user to surf the HTML webpage reads out text recited in screen reader readout A (204) as presented in FIG. 2B. In this example, the layout table is used for formatting purposes and is not useful for a blind user of a screen reader. However, the particular screen reader, when reading out the displayed contents rendered by a browser, reads out table layout information such as "table with two columns and four rows" and "table end". This table information should not have been read out by the particular screen reader to a blind user because the table is intended for layout purposes and clutters the other information presented to the blind user.

Figure 3A:
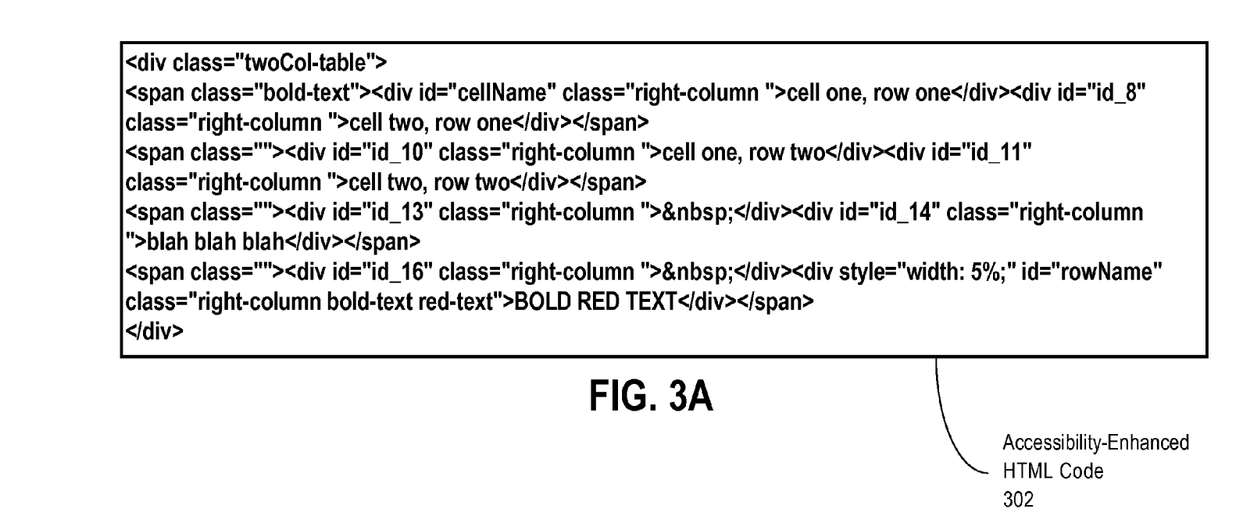
Figure 3B:
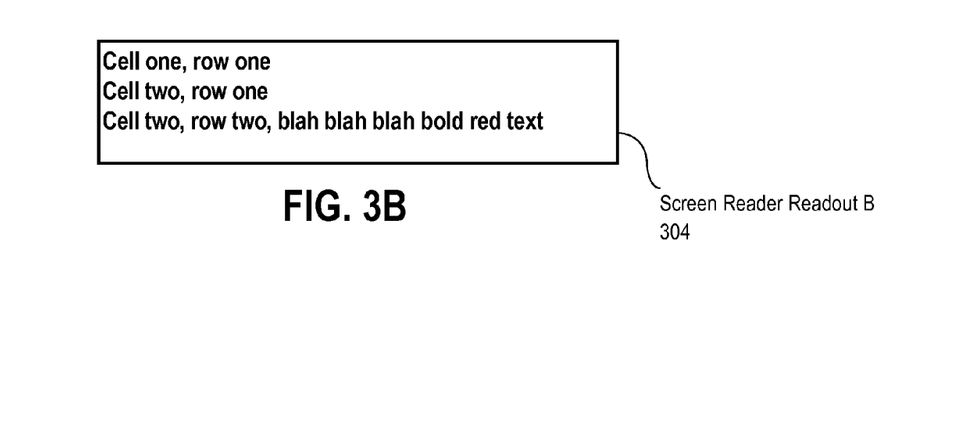

The original HTML code (202) is modified in accordance with one or more embodiments to produce accessibility-enhanced HTML code (302) as illustrated in FIG. 3A. The accessibility-enhanced HTML code (302) which is based on the original HTML code (202) presents the same information as the original HTML code (202) when rendered by a browser. A screen reader playing an audio readout of a rendered webpage, which includes the accessibility-enhanced HTML code (302), reads out text recited in screen reader readout B (304). The text recited in screen reader readout B (304) does not include the table information included in screen reader readout A (204) and accordingly, does not clutter the information provided to a blind user. The accessibility-enhanced HTML code improves a user's ability to understand the content of the webpage.

Document Modification by a Server Machine

In an embodiment, the document modifier (120) is implemented on the server machine (110). In an example, the document modifier (120) is an application or a component of an application that modifies one or more documents (114) stored on the server machine (110) to produce modified documents (116). The modified documents (116) are stored on the server, by the document modifier, as accessibility-enabled documents instead of or in addition to the original documents (114).

In an embodiment, the document modifier (120) is executed on the server machine (110) in response to receiving a request for a document from the client machine (102). In an example, the server machine (110) receives a request for a particular document (114). In response to the request, a document modifier (120) on the server machine (110) determines that the particular requested document (114) is not accessibility enabled during an analysis of the particular requested document (114). The document (114) is analyzed to identify tags that are not recognizable by assistive technologies (106). The server machine (110) executes the document modifier (120) to produce a modified document (116) which is an accessibility-enabled version of the particular requested document (114). In response to receiving a request from the client machine (102) for the particular document (114), the server machine (110) sends the modified document (116).

In an embodiment, the request received by server (110) from any client machine (102) indicates whether or not an accessibility-enabled document is requested. The server machine (110) returns the original document (114) or an accessibility-enabled document (for example, the modified document (116)) depending on whether an accessibility-enabled document is requested. In an example, the client machine (102) requests an accessibility-enabled document based on the preferences of a user of the client machine (102). For example, user preferences identify a particular disability of a user of the client machine (102). Based on the particular disability of the user, the client machine (102) or an application executing on the client machine (102) requests a document which can be interpreted by a specific assistive technology (106) designed for that particular disability.

Document Modification by a Client Machine

In an embodiment, the document modifier (120) is implemented on the client machine (102). For example, the document modifier (120) is an application that receives requested documents (114) from the server (110) and converts the documents (114) to modified documents (116) for storing on the client machine (102) or for immediate use on the client machine (102).

In an embodiment, the document modifier (120) is implemented as a component of an application that provides access to the modified document (116). In an example, the document modifier (120) is implemented within a browser (104). The browser (104) receives a request from a user to display a particular document (114). The browser (104) then requests and obtains the particular document (114) from the server machine (110). Subsequent to obtaining the document (114), the document modifier (120) in the browser (104) converts the document (114) to a modified document (116) that is to be rendered for display. The browser (104) then renders the modified document (116) for display while a screen reader interprets the modified document (116) to extract information for presentation to a user.

In an embodiment, the document modifier (120) is activated in response to a user command. In an example, a document (114) is displayed by a browser (104) executing on the client machine (102). Subsequent to the display by the browser (104), the user selects an accessibility option (for example, by selecting an accessibility button on a toolbar) to make the document (114) accessibility-enabled. In response to the user selection, the document modifier (120) executes a script for adding accessibility features (118) to document (114) for producing a modified document (116). The script further calls a text-to-speech procedure to read out the text from the modified document (116) while document (114) is still being displayed by the browser (104). Alternatively, the browser (104) renders the modified document (116) for display and a screen reader automatically reads out the contents of the modified document (116) in response to display of the modified document (116) by the browser (104).

Document Modification by a Server Machine and a Client Machine

In an embodiment, document modifiers (120) are implemented on both of the server machine (110) and the client machine (102). In an example, one document modifier (120) is implemented as a server plugin, launched by server (110), to handle an HTTP request from the client machine (102) for a document (114). The server plugin accesses the document (114) from a database at the server (110) and adds JQuery or JavaScript to obtain a modified document (116). The JQuery or JavaScript if executed would produce an accessibility-enabled version of the document (114) that can be properly interpreted by a screen reader (for example, execution of the JavaScript causes adding, removing, or modifying of information based on suitability for a screen reader). The server plugin then prepares an HTTP response with the modified document (116) and sends the modified document (116) to the client machine (102). A second document modifier (120) is implemented as a component of a browser (104) executing on the client machine (102). The component of the browser (104) parses the modified document (116) and executes the JavaScript added by the server plugin. The execution of the JavaScript results in adding one or more accessibility features (118) to the modified document (116) that were not previously included in the document (114). The browser (104) then renders the modified document (116) with the additional one or more accessibility features (118) for display to a user. A screen reader reads out content from the displayed document by properly interpreting the HTML and distinguishing the content that is to be read out from the formatting elements that are not be read out.

Document Modification Steps

Figure 4:
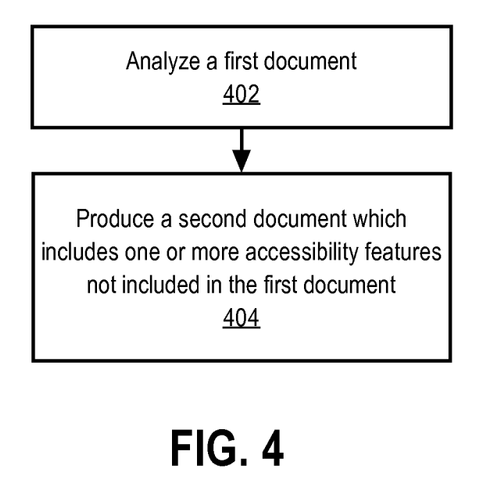
FIG. 4 is a flow diagram illustrating an example method for automatically producing documents to improve document accessibility in accordance with one or more embodiments.

FIG. 4 shows an example of document modification by one or more document modifiers. The steps described below are performed by executing code that is within a document being modified or code that is separate from a document being modified. The steps described below may be performed on a server machine, a client machine, or a combination of the server machine and client machine. Examples refer to a specific machine performing the steps for the purposes of clarity and understanding. In one or more embodiments, one or more of the steps described below may be omitted, repeated, and/or performed in a different order. Accordingly, the specific arrangement of steps shown in FIG. 4 should not be construed as limiting the scope of the claims.

Document Analysis

Initially, a document is analyzed (Step 402). In an embodiment, the document is analyzed to identify inaccessible features. In an example, inaccessible features are identified by searching for text that is known to be misinterpreted by one or more assistive technologies. In a HTML document, the text to be searched may include particular HTML formatting tags or particular document elements (for example, a layout table). In another example, the identification of inaccessible features includes identifying formatting and styles for content that do not use cascading style sheets.

In an embodiment, the identification of inaccessible features is based on the functionality or capabilities of a particular assistive technology. For example, features known to be in inaccessible by a particular screen reader are identified. The screen reader is not be able to distinguish specific formatting tags from content or is not be able to present content associated with these specific formatting tags in a manner which conveys the correct information to a user. In another example, an assistive technology is not updated to recognize new keywords in a new version of a programming language or to interpret document information created by a new version of a software application.

In an embodiment, analysis of a document includes evaluating elements to determine whether the elements meet guidelines from the Web Accessibility Initiative-Accessible Rich Internet Applications (WAI-ARIA). In an example, multiple HTML elements that form a single sentence to a viewer are evaluated to determine whether "aria-labelledby" attribute should be used and if the "aria-labelledby" attribute is in fact being used.

In an example, an analysis of a document includes identifying form fields which require input. The analysis involves a search for a "*" or a red font which is customarily used to indicate a required field. If a required field is found, then a determination is made whether a "aria-required" attribute is associated with the field for indicating to a screen reader that the field is required. If the "aria-required" attribute is not found for a required field, the required field is flagged for modification in Step 404 described below.

In an example, elements are evaluated to determine whether elements have ids by which they can be referred to or have controls that are keyboard accessible. In an example, the evaluation of an element <li class="tab tab-css tabindex_true">Classroom</li> results in determining the element lacks an "id" and/or lacks "aria-controls".

In an embodiment, analysis of a document includes defining an element based representation of the document, which is referred to herein as a model of the document. Defining a model of the document includes identifying one or more elements within the document for storing in a data structure. An element corresponds to a data value (for example, displayed data) or a keyword value (for example, a formatting tag). The model of the document includes element characteristics. Examples of element characteristics include, but are not limited to, an element value, the manner in which an element is presented, the manner in which an element is accessed, the manner in which an element is manipulated, or the relationship of an element to other elements. The identified elements within a model are represented as nodes within a tree data structure, a directed graph, or other suitable data structure. In an example, a model of a HTML or XML document is defined using a Document Object Model (DOM). In an example, a HTML table from a HTML document is used to generate a table object that represents the HTML table.

In an embodiment, values or properties of a table object are accessed using commands from an application programming interface. For example, a command is executed to search for table layout tags in a HTML document that indicate the beginning and end of table cells. Based on the identified table layout tags, the cell values are extracted.

In an example, a HTML document is used to generate an object with elements by traversing the HTML document using a tokenizer with HTML tags (for example, "<tr>" or "<td>") as delimiters. Data values such as displayed text or images between a set of HTML tags are identified as a token by the tokenizer. The delimiters (for example, the HTML tags) may also be identified as tokens if the tag themselves need to be stored. The delimiters may be interpreted and delimiter information such as tag characteristics (style, position, etc.) are stored in the data structure. In an example, a title of a HTML table is stored as a parent node and the cell values within the HTML table are stored as child nodes under that parent node. In this example, the placement of a node within the tree indicates the relationship of the node with other nodes.

Document Production

In an embodiment, the analysis of a first document is used to produce a second document which includes one or more accessibility features that were not included in the first document (Step 404). Producing the second document is performed by one or more of: modifying the first document itself or by creating new document(s) that are separate than the first document. Any examples which refer to modifying a first document to obtain the second document may instead be implemented by creating one or more new documents. Any examples which refer to creating a second document that is separate from the first document may instead be implemented by modifying the first document to create the second document. The terms second document and modified document are used interchangeably herein.

In an embodiment, the second document is produced based on the contents of the first document. The second document is a result of replacing inaccessible features of the first document with accessible features. For example, the inaccessible features identified in Step 402 which include tags that are not recognized by screen readers as formatting tags are replaced by tags that are recognized by screen readers as formatting tags. The production of the second document includes implementing a find and replace function for finding each tag in a first set of one or more tags and replacing each tag with a corresponding tag in a second set of one or more tags.

In an embodiment, the second document is produced by adding classes to content within the first document. Characteristics (for example, formatting styles or triggering events) for particular classes are defined within the second document or defined using separate documents such as, for example, cascading style sheets.

In an embodiment, the second document is produced by adding an "id" to one or more elements so the one or more elements can be referred to by other elements. For example, an "id" is added to an input field so that a <label> tag can refer to the "id" for assignment of a label to the input field. In an example, an "id" value is assigned to ids in a numeric chronological order or using content in proximity of the DOM. In an example, an <h1> tag is assigned an "id" equivalent to the contents within the <h1> tags.

In an embodiment, the second document is produced by modifying the first document according to WAI-ARIA guidelines. For example, attributes such as "aria-required", "aria-labelledby", and "aria-describedby" are added to provide assistive technologies with information to read out to a user. In an example, <div class="application"> is modified to <div class="application" aria-labelledby="application_label0">.

In an embodiment, if a link has no title, then a title attribute is automatically created. In an example, HTML code <a href="this-link.html"> this is a link</a> is modified to add a title using HTML code <a href="this-link.html" title="this is a link"> this is a link</a>. In an example, if an image is used only as a design element (for example, a page divider line), then the "alt" attribute is set to an empty string so that a screen reader does not narrate a file name of the design element.

In an embodiment, producing the second document includes using an element based representation of the first document. As described above, an element based representation of the first document includes a data structure where each node or entry within the data structure corresponds to an element in the first document. In an example, the data structure is a tree that can be traversed to produce the second document. A table represented by a tree data structure is traversed using a tree traversal algorithm which traverses each node of the tree to identify the elements within the tree and identify corresponding element characteristics. The traversal of the data structure is used to identify the relationships between different elements of the tree. Using the information in the data structure, the second document is programmatically created by adding text to a document based on information within the nodes as the nodes are traversed. Creating the second document includes using accessibility-enabled tags that were not used in the first document. For example, formatting using a layout table in a first document is recreated from a representation of the first document and using the <div> tag and <span> tag.

In an embodiment, cascading style sheets are used to format or style one or more elements within a document. For example, elements that are individually defined with different styles are reformatted using cascading style sheets.

In an embodiment, producing a second document includes modifying web pages to add one or more of: labels, fieldsets, legends, or landmarks. For example, landmarks are added to different displayed portions of a document to allow for easy traversal from one landmark to another using keyboard input such as tab or arrows. The landmarks allow a user to navigate between input fields, text, images, sections, etc. In an embodiment, labels that are read out by screen readers are associated with different landmarks so that a blind user can easily identify the currently selected portion of a document. In an embodiment, producing a second document includes implementing a shortcut (for example, ESC key) to close a window (for example, a pop up window).

In an example, an original document includes the following HTML code:

```
<div id="tabpanel1">
<ul class="tablist-css">
<li id="testtabid" class="tab-css">Home</li>
<li class="tab tab-css tabindex_true">Classroom</li>
<li class="tab-css">Library</li>
<li class="tab-css">PhoenixConnect</li>
</ul>
<div>
<div>
<p>home tab</p>
</div>
</div>
```

The original document is first modified to include one or more classes:

```
<div class="div-tab">
<div id="tabpanel1" class="tabpanel">
<ul class="tablist tablist-css">
<li id="testtabid" class="tab tab-css selected tabindex_true">Home</li>
<li class="tab tab-css tabindex_true">Classroom</li>
<li class="tab tab-css tabindex_true">Library</li>
<li class="tab tab-css tabindex_true">PhoenixConnect</li>
</ul>
<div class="div-tabpanel">
<div class="tabpanel panel tabindex_true">
<p>home tab</p> </div>
</div>
</div>
```

Furthermore, ids are added for reference and the resulting accessibility-enhanced code recites:

```
<div class="div-tab">
<div class="tabpanel" id="tabpanel1">
<ul class="tablist tablist-css">
<li class="tab tab-css selected tabindex_true" id="testtabid" aria-controls=" panel0" >Home</li>
<li class="tab tab-css tabindex_true" id="tab 1" aria-controls="testpanelid">Classroom</li>
<li class="tab tab-css tabindex_true" id="tab2" aria-controls="panel2">Library</li>
<li class="tab tab-css tabindex_true" id="tab3" aria-controls=" panel3">PhoenixConnect</li>
</ul>
<div class="div-tabpanel">
<div class="tabpanel panel tabindex_true" id="panel0" aria-labelledby="testtabid" tabindex="0">
<p>home tab</p>
</div>
</div>
```

In another example, a form is modified to improve accessibility. The original document recites:

```
<form class="form">
<span id="firstname_span">First Name:</span>
<input type="text"id="firstname" />
<br />
<span id="lastname_span">Last Name:</span>
<input type="text"name="lastname" />
<br />
<input type="submit" value="Submit"/>
</form>
```

The original document is modified to add classes and divs and recite:

```
<div class="application">
<form class="form"> <div class="form-basic textbox">
<span id="firstname_span" class,"span_form">First Name:</span>
<input type="text" id="firstname" />
<br /> </div>
<div class="form-basic textbox">
<span id="lastname_span" class="span_form">Last Name:</span>
<input type="text" name="lastname" />
<br /> </div>
<div class>"form-basic submit"> <input type="submit" value="Submit"/> </div>
</form> </div>
```

The document is further modified to include labels and recite:

```
<div class="application" aria-labelledby="application_label0">
<form class="form"><div class="form-basic textbox">
<span class="span_form" id="firstname_span">
<label for="firstname">First Name:</label></span>
<input type="text" id="firstname">
<br></div>
<div class="form-basic textbox">
<span class,"span_form" id="lastname_span"><label for="input1">Last Name:</label></span><input type="text" name="lastname" id="input1">
<br></div>
<div class="form-basic submit"> <input type="submit" value="Submit" id="input8"></div>
</form></div>
```

In another example, a document lacks particular ARIA attributes and originally recites:

```
<div class="log-aria">
<h2 id="region2Label">Log Text using Aria Live Region</h2>
<div class="log atomic_false live_assertive relevant_additions">
<!— dynamic text
</div>
</div>
```

The document is automatically modified to add the aria-labelledby, aria-relevant, aria-atomic, and aria-live attributes to recite:

```
<div class="log-aria">
<h2 id="region2Label">Log Text using Aria Live Region</h2>
<div class="log atomic_false live_assertive relevant_additions"
aria-labelledby="region2Label" aria-relevant,"all"
aria-atomic="true" aria-live="assertive" >
<!— dynamic text →
</div>
</div>
```

In an embodiment, producing a second document includes automatically creating a draft document by including one or more accessibility features that were not included in the original document. The automatically created draft document is then presented to a user for manual changes, verifications, and corrections. For example, a label generated in accordance with one or more embodiments is presented to a user for approval or for editing.

Any of the steps recited above for producing a second document which includes one or more accessibility features not included in the first document may be combined with other steps for producing the second document. Multiple accessibility features are added to a document for producing an accessibility-enabled document in accordance with one or more embodiments.

Hardware Overview

Figure 5:
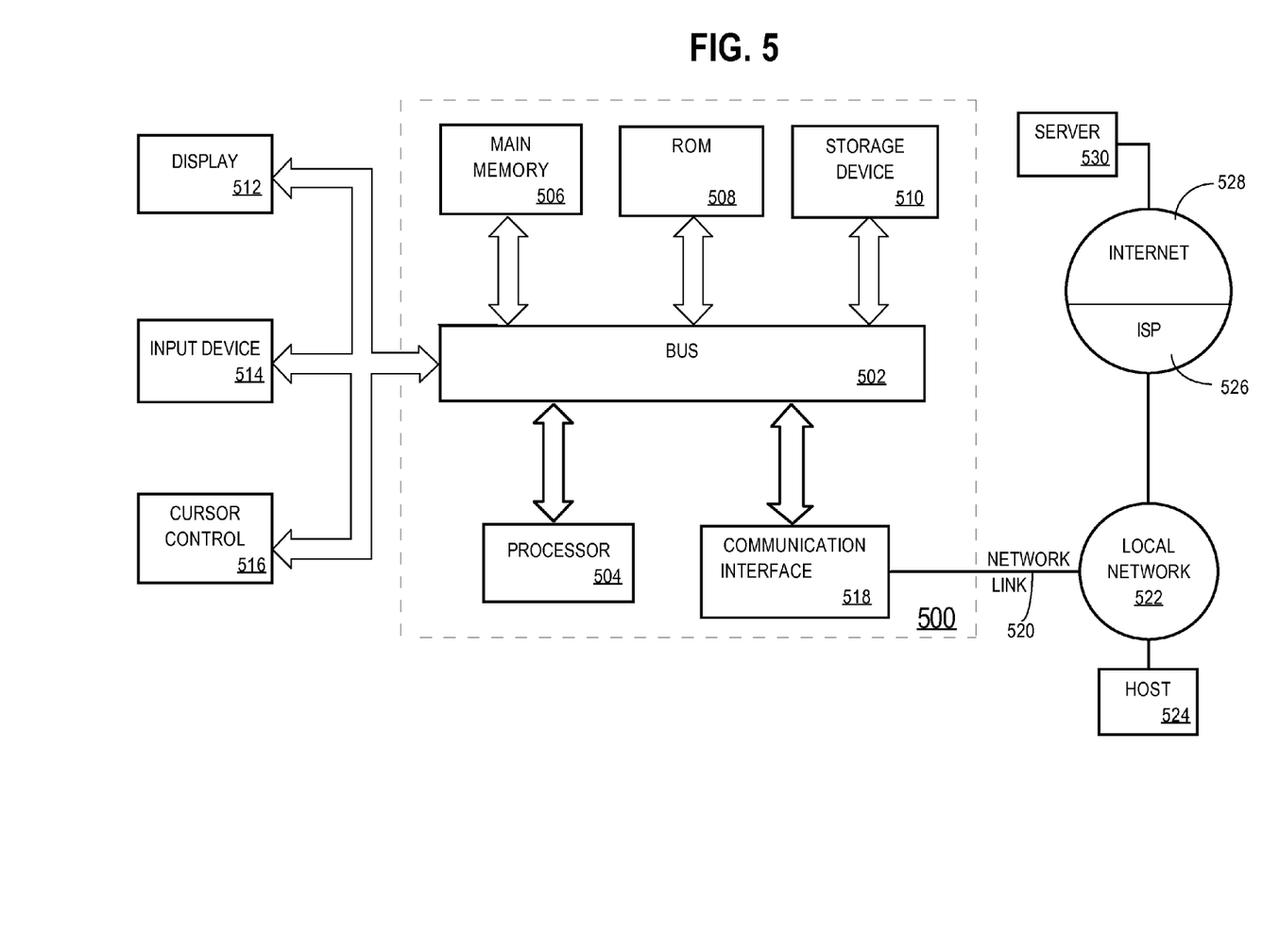
FIG. 5 is a block diagram illustrating a computer system that may be used in implementing one or more embodiments.

FIG. 5 is a block diagram that illustrates a computer system 500 upon which one or more embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, documents are modified by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement one or more embodiments. Thus, embodiments are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    storing a first version of a particular document in storage accessible to a server-side machine;
    generating, by the server-side machine, an accessibility-enabled version of the particular document based on the first version of the particular document;
    wherein the accessibility-enabled version of the particular document has one or more accessibility features, which are not present in the first version of the particular document, that facilitate use of a particular assistive technology;
    storing the accessibility-enabled version in the storage accessible to the server-side machine;
    receiving a request, from a client-side machine, for the particular document;
    determining, by the server-side machine, whether to respond to the request with the first version of the particular document or the accessibility-enabled version of the particular document;
    responsive to determining to respond to the request with the first version of the particular document, the server-side machine sending the first version of the particular document to the client-side machine; and
    responsive to determining to respond to the request with the accessibility-enabled version of the particular document, the server-side machine sending the accessibility enabled version of the particular document to the client-side machine.

2. The method of claim 1, wherein generating the accessibility-enabled version of the particular document based on the first version of the particular document comprises:
    identifying data for the accessibility-enabled version of the particular document from the first version of the particular document; and
    automatically replacing, in the data for the accessibility-enabled version of the particular document, each instance of each tag of a first set of one or more tags with a corresponding tag of a second set of one or more tags.

3. The method of claim 1, wherein generating the accessibility-enabled version of the particular document comprises:
    parsing the first version of the particular document to identify a plurality of elements within the first version of the particular document;
    generating a data structure that (a) comprises the plurality of elements and (b) represents a relationship between two or more elements of the plurality of elements; and
    producing the accessibility-enabled version of the particular document based on the data structure.

4. The method of claim 3, wherein the data structure comprises a plurality of nodes, wherein each node of the plurality of nodes represents an element within the plurality of elements, and wherein producing the accessibility-enabled version of the particular document comprises:
    traversing each node in the plurality of nodes within the data structure, wherein traversing a particular node of the plurality of nodes comprises determining a data value for the particular node and a relationship of the particular node to at least one other node in the plurality of nodes.

5. The method of claim 3, wherein the data structure is generated using a document object model (DOM) application programming interface.

6. The method of claim 1, further comprising:
    generating a cascading style sheet for formatting one or more first elements, in the accessibility-enabled version of the particular document;
    wherein one or more second elements, in the first version of the particular document, correspond to the one or more first elements in the accessibility-enabled version of the particular document; and
    wherein the one or more second elements that were not formatted using any cascading style sheet associated with the first version of the particular document.

7. The method of claim 1, wherein generating the accessibility-enabled version of the particular document comprises one or more of: modifying the first version of the particular document to obtain the accessibility-enabled version of the particular document; or creating the accessibility-enabled version of the particular document that is separate from the first version of the particular document.

8. The method of claim 1, wherein:
    generating the accessibility-enabled version of the particular document comprises identifying data for the accessibility-enabled version of the particular document from the first version of the particular document; and
    generating the accessibility-enabled version of the particular document further comprises performing, in the data for the accessibility-enabled version of the particular document, one or more of:

modifying at least one tag, in the data for the accessibility-enabled version, that would not properly be interpreted by the particular assistive technology;

replacing at least one tag, in the data for the accessibility-enabled version, that would not properly be interpreted by the particular assistive technology with a different tag;

adding an identification value or label to at least one tag in the data for the accessibility-enabled version;

adding a description to at least one tag in the data for the accessibility-enabled version, wherein the description (a) can be interpreted by the particular assistive technology and (b) is not displayed when the accessibility-enabled version of the particular document is rendered for display by a browser; or reformatting one or more elements, in the accessibility-enabled version of the particular document, using cascading style sheets.

9. The method of claim 1, wherein:

the one or more accessibility features allow a user to navigate between two or more elements, in the accessibility-enabled version of the particular document, using a keyboard; and the two or more elements could not be navigated using the keyboard in the first version of the particular document.

10. The method of claim 1, wherein:

the particular document is a particular web page associated with a particular web site; and the method further comprises:

generating accessibility-enabled versions of one or more other web pages associated with the particular web site, and storing the accessibility-enabled versions of the one or more other web pages associated with the particular web site in the storage accessible to the server-side machine.

11. The method of claim 1, wherein generating the accessibility-enabled version of the particular document is performed by executing instructions that are stored, at least in part, within the first version of the particular document.

12. The method of claim 1, wherein generating the accessibility-enabled version of the particular document is performed by a component of a browser, executing on the client-side machine.

13. The method of claim 1, wherein generating the accessibility-enabled version of the particular document is performed in response to receiving the request, from the client-side machine, for the particular document.

14. The method of claim 1, wherein:

the particular document is a web page; and the one or more accessibility features comprise one or more of:

one or more tags, included in the accessibility-enabled version of the particular document and not included in the first version of the particular document, that facilitate use of the particular assistive technology with the particular document, or one or more tags, not included in the accessibility-enabled version of the particular document and included in the first version of the particular document, that should not be presented to a user by the particular assistive technology for the particular document.

15. The method of claim 1, wherein the particular assistive technology is one or more of: an application that renders the particular document for display; or an application that interprets the particular document for audio readout.

16. One or more non-transitory computer readable media comprising instructions which, when executed by one or more processors, causes performance of steps comprising:

storing a first version of a particular document in storage accessible to a server-side machine;

generating, by the server-side machine, an accessibility-enabled version of the particular document based on the first version of the particular document;

wherein the accessibility-enabled version of the particular document has one or more accessibility features, which are not present in the first version of the particular document, that facilitate use of a particular assistive technology;

storing the accessibility-enabled version in the storage accessible to the server-side machine;

receiving a request, from a client-side machine, for the particular document;

determining, by the server-side machine, whether to respond to the request with the first version of the particular document or the accessibility-enabled version of the particular document;

responsive to determining to respond to the request with the first version of the particular document, the server-side machine sending the first version of the particular document to the client-side machine; and responsive to determining to respond to the request with the accessibility-enabled version of the particular document, the server-side machine sending the accessibility enabled version of the particular document to the client-side machine.

17. The one or more non-transitory computer readable media of claim 16, wherein generating the accessibility-enabled version of the particular document based on the first version of the particular document comprises:

identifying data for the accessibility-enabled version of the particular document from the first version of the particular document; and automatically replacing, in the data for the accessibility-enabled version of the particular document, each instance of each tag of a first set of one or more tags with a corresponding tag of a second set of one or more tags.

18. The one or more non-transitory computer readable media of claim 16, wherein generating the accessibility-enabled version of the particular document comprises:

parsing the first version of the particular document to identify a plurality of elements within the first version of the particular document;

generating a data structure that (a) comprises the plurality of elements and (b) represents a relationship between two or more elements of the plurality of elements; and producing the accessibility-enabled version of the particular document based on the data structure.

19. The one or more non-transitory computer readable media of claim 18, wherein the data structure comprises a plurality of nodes, wherein each node of the plurality of nodes represents an element within the plurality of elements, and wherein producing the accessibility-enabled version of the particular document comprises:

traversing each node in the plurality of nodes within the data structure, wherein traversing a particular node of the plurality of nodes comprises determining a data value for the particular node and a relationship of the particular node to at least one other node in the plurality of nodes.

20. The one or more non-transitory computer readable media claim 18, wherein the data structure is generated using a document object model (DOM) application programming interface.

21. The one or more non-transitory computer readable media of claim 16, further comprising instructions which, when executed by the one or more processors, cause:
generating a cascading style sheet for formatting one or more first elements, in the accessibility-enabled version of the particular document;
wherein one or more second elements, in the first version of the particular document, correspond to the one or more first elements in the accessibility-enabled version of the particular document; and
wherein the one or more second elements that were not formatted using any cascading style sheet associated with the first version of the particular document.

22. The one or more non-transitory computer readable media claim 16, wherein generating the accessibility-enabled version of the particular document comprises one or more of: modifying the first version of the particular document to obtain the accessibility-enabled version of the particular document; or creating the accessibility-enabled version of the particular document that is separate from the first version of the particular document.

23. The one or more non-transitory computer readable media of claim 16, wherein:
generating the accessibility-enabled version of the particular document comprises identifying data for the accessibility-enabled version of the particular document from the first version of the particular document; and
generating the accessibility-enabled version of the particular document further comprises performing, in the data for the accessibility-enabled version of the particular document, one or more of:
modifying at least one tag, in the data for the accessibility-enabled version, that would not properly be interpreted by the particular assistive technology;
replacing at least one tag, in the data for the accessibility-enabled version, that would not properly be interpreted by the particular assistive technology with a different tag;
adding an identification value or label to at least one tag in the data for the accessibility-enabled version;
adding a description to at least one tag in the data for the accessibility-enabled version, wherein the description (a) can be interpreted by the particular assistive technology and (b) is not displayed when the accessibility-enabled version of the particular document is rendered for display by a browser; or
reformatting one or more elements, in the accessibility-enabled version of the particular document, using cascading style sheets.

24. The one or more non-transitory computer readable media of claim 16, wherein:
the one or more accessibility features allow a user to navigate between two or more elements, in the accessibility-enabled version of the particular document, using a keyboard; and
the two or more elements could not be navigated using the keyboard in the first version of the particular document.

25. The one or more non-transitory computer readable media of claim 16, wherein:
the particular document is a particular web page associated with a particular web site; and
the one or more non-transitory computer readable media further comprise instructions which, when executed by the one or more processors, cause:
generating accessibility-enabled versions of one or more other web pages associated with the particular web site, and
storing the accessibility-enabled versions of the one or more other web pages associated with the particular web site in the storage accessible to the server-side machine.

26. The one or more non-transitory computer readable media of claim 16, wherein generating the accessibility-enabled version of the particular document is performed by executing instructions that are stored, at least in part, within the first version of the particular document.

27. The one or more non-transitory computer readable media of claim 16, wherein generating the accessibility-enabled version of the particular document is performed by a component of a browser, executing on the client-side machine.

28. The one or more non-transitory computer readable media of claim 16, wherein generating the accessibility-enabled version of the particular document is performed in response to receiving the request, from the client-side machine, for the particular document.

29. The one or more non-transitory computer readable media of claim 16, wherein:
the particular document is a web page; and
the one or more accessibility features comprise one or more of:
one or more tags, included in the accessibility-enabled version of the particular document and not included in the first version of the particular document, that facilitate use of the particular assistive technology with the particular document, or
one or more tags, not included in the accessibility-enabled version of the particular document and included in the first version of the particular document, that should not be presented to a user by the particular assistive technology for the particular document.

30. The one or more non-transitory computer readable media of claim 16, wherein the particular assistive technology is one or more of: an application that renders the particular document for display; or an application that interprets the particular document for audio readout.

31. A system comprising:
one or more processors;
one or more non-transitory computer readable media comprising instructions which, when executed by one or more processors, causes performance of steps comprising:
storing a first version of a particular document in storage accessible to a server-side machine;
generating, by the server-side machine, an accessibility-enabled version of the particular document based on the first version of the particular document;
wherein the accessibility-enabled version of the particular document has one or more accessibility features, which are not present in the first version of the particular document, that facilitate use of a particular assistive technology;
storing the accessibility-enabled version in the storage accessible to the server-side machine;
receiving a request, from a client-side machine, for the particular document;
determining, by the server-side machine, whether to respond to the request with the first version of the particular document or the accessibility-enabled version of the particular document;
  responsive to determining to respond to the request with the first version of the particular document, the server-side machine sending the first version of the particular document to the client-side machine; and
  responsive to determining to respond to the request with the accessibility-enabled version of the particular document, the server-side machine sending the accessibility-enabled version of the particular document to the client-side machine.

32. The system of claim 31, wherein generating the accessibility-enabled version of the particular document based on the first version of the particular document comprises:
  identifying data for the accessibility-enabled version of the particular document from the first version of the particular document; and
  automatically replacing, in the data for the accessibility-enabled version of the particular document, each instance of each tag of a first set of one or more tags with a corresponding tag of a second set of one or more tags.

33. The system of claim 31, wherein generating the accessibility-enabled version of the particular document comprises:
  parsing the first version of the particular document to identify a plurality of elements within the first version of the particular document;
  generating a data structure that (a) comprises the plurality of elements and (b) represents a relationship between two or more elements of the plurality of elements; and
  producing the accessibility-enabled version of the particular document based on the data structure.

34. The system of claim 33, wherein the data structure comprises a plurality of nodes, wherein each node of the plurality of nodes represents an element within the plurality of elements, and wherein producing the accessibility-enabled version of the particular document comprises:
  traversing each node in the plurality of nodes within the data structure, wherein traversing a particular node of the plurality of nodes comprises determining a data value for the particular node and a relationship of the particular node to at least one other node in the plurality of nodes.

35. The system of claim 33, wherein the data structure is generated using a document object model (DOM) application programming interface.

36. The system of claim 31, wherein the one or more non-transitory computer readable media further comprise instructions which, when executed by the one or more processors, cause:
  generating a cascading style sheet for formatting one or more first elements, in the accessibility-enabled version of the particular document;
  wherein one or more second elements, in the first version of the particular document, correspond to the one or more first elements in the accessibility-enabled version of the particular document; and
  wherein the one or more second elements that were not formatted using any cascading style sheet associated with the first version of the particular document.

37. The system of claim 31, wherein generating the accessibility-enabled version of the particular document comprises one or more of: modifying the first version of the particular document to obtain the accessibility-enabled version of the particular document; or creating the accessibility-enabled version of the particular document that is separate from the first version of the particular document.

38. The system of claim 31, wherein:
  generating the accessibility-enabled version of the particular document comprises identifying data for the accessibility-enabled version of the particular document from the first version of the particular document; and
  generating the accessibility-enabled version of the particular document further comprises performing, in the data for the accessibility-enabled version of the particular document, one or more of:
    modifying at least one tag, in the data for the accessibility-enabled version, that would not properly be interpreted by the particular assistive technology;
    replacing at least one tag, in the data for the accessibility-enabled version, that would not properly be interpreted by the particular assistive technology with a different tag;
    adding an identification value or label to at least one tag in the data for the accessibility-enabled version;
    adding a description to at least one tag in the data for the accessibility-enabled version, wherein the description (a) can be interpreted by the particular assistive technology and (b) is not displayed when the accessibility-enabled version of the particular document is rendered for display by a browser; or
    reformatting one or more elements, in the accessibility-enabled version of the particular document, using cascading style sheets.

39. The system of claim 31, wherein:
  the one or more accessibility features allow a user to navigate between two or more elements, in the second accessibility-enabled version of the particular document, using a keyboard; and
  the two or more elements could not be navigated using the keyboard in the first version of the particular document.

40. The system of claim 31, wherein:
  the particular document is a particular web page associated with a particular web site; and
  the one or more non-transitory computer readable media further comprise instructions which, when executed by the one or more processors, cause:
    generating accessibility-enabled versions of one or more other web pages associated with the particular web site, and
    storing the accessibility-enabled versions of the one or more other web pages associated with the particular web site in the storage accessible to the server-side machine.

41. The system of claim 31, wherein generating the accessibility-enabled version of the particular document is performed by executing instructions that are stored, at least in part, within the first version of the particular document.

42. The system of claim 31, wherein generating the accessibility-enabled version of the particular document is performed by a component of a browser, executing on the client-side machine.

43. The system of claim 31, wherein generating the accessibility-enabled version of the particular document is performed in response to receiving the request, from the client-side machine, for the particular document.

44. The system of claim 31, wherein:
  the particular document is a web page; and
  the one or more accessibility features comprise one or more of:
    one or more tags, included in the accessibility-enabled version of the particular document and not included in the first version of the particular document, that facilitate use of the particular assistive technology with the particular document, or one or more tags, not included in the accessibility-enabled version of the particular document and included in the first version of the particular document, that should not be presented to a user by the particular assistive technology for the particular document.

45. The system of claim 31, wherein the particular assistive technology is one or more of: an application that renders the particular document for display; or an application that interprets the particular document for audio readout.

* * * * *